United States Patent [19]
Davidson et al.

[11] Patent Number: 5,353,626
[45] Date of Patent: Oct. 11, 1994

[54] MECHANICAL CONTROL CABLE SYSTEM

[75] Inventors: Daniel F. Davidson, Flagstaff; David J. Myers, Camp Verde; Jerry L. Johnson, Flagstaff, all of Ariz.

[73] Assignee: W. L. Gore & Associates, Inc., Newark, Del.

[21] Appl. No.: 191,740

[22] Filed: Jan. 31, 1994

Related U.S. Application Data

[63] Continuation of Ser. No. 62,476, May 13, 1993, abandoned, which is a continuation of Ser. No. 806,526, Dec. 13, 1991, abandoned.

[51] Int. Cl.⁵ .................................... F16C 1/10
[52] U.S. Cl. ...................... 74/502.6; 74/502.4; 74/500.5; 74/501.5 R
[58] Field of Search ..................... 74/500.5–502.6

[56] References Cited

U.S. PATENT DOCUMENTS

| | | | |
|---|---|---|---|
| 3,192,795 | 7/1965 | Pierce | 74/502.5 |
| 3,369,426 | 2/1968 | Matz | 74/502.5 |
| 4,038,881 | 8/1977 | Conrad | 74/502.5 |
| 4,321,840 | 3/1982 | Kalamon | 74/502.4 X |
| 4,534,239 | 8/1985 | Heimann | 74/502.4 |
| 4,716,781 | 1/1988 | Dussault | 74/502.6 X |
| 4,898,046 | 2/1990 | Mancewicz et al. | 74/502.5 |
| 5,003,837 | 4/1991 | Italiano | 74/501.5 R |

FOREIGN PATENT DOCUMENTS

| | | | |
|---|---|---|---|
| 127185 | 12/1984 | European Pat. Off. | 74/502.5 |
| 2012170 | 1/1971 | Fed. Rep. of Germany | 74/502.5 |
| 9013765 | 12/1990 | Fed. Rep. of Germany | 74/502.5 |
| 1333515 | 7/1963 | France | 74/502.3 |
| 2381937 | 9/1978 | France | 74/502.4 |
| 2418741 | 9/1979 | France | 74/502.4 |
| 270809 | 11/1987 | Japan | 74/500.5 |
| 1128797 | 10/1968 | United Kingdom | 74/502.4 |
| 1473110 | 5/1977 | United Kingdom | 74/502.5 |
| 2176562 | 12/1986 | United Kingdom | 74/502.5 |

*Primary Examiner*—Vinh T. Luong
*Attorney, Agent, or Firm*—Wayne D. House

[57] ABSTRACT

An improved mechanical control cable system of the push-pull type. Conventional push-pull cable systems typically include straight portions and curved portions. These conventional systems incorporate a push-pull cable having a metal wire housing enclosing at least the curved portion of the system and frequently both the curved and straight portions. These metal wire housings frequently incorporate a tubular polymeric liner only within the metal wire housing. The improved system has a continuous tubular polymeric liner enclosing both the curved and straight system portions while only the curved system portions are further enclosed by a metal wire housing.

8 Claims, 5 Drawing Sheets

MECHANICAL CONTROL CABLE SYSTEM

This application is a continuation of application Ser. No. 08/062,476 filed May 13, 1993 which is a continuation of application Ser. No. 07/806,526 filed Dec. 13, 1991 now abandoned.

FIELD OF THE INVENTION

This invention relates to the field of mechanical control cable systems of the push-pull type.

BACKGROUND OF THE INVENTION

Mechanical control cables of the push-pull type are well known. They typically comprise a cable enclosed by a somewhat flexible supporting housing that allows for a transfer of motion around curves by the cable. The housing also provides mechanical protection to the cable, minimizing the risk of mechanical damage to the cable and maintaining the cable in a cleaner condition than if it were exposed.

Typical supporting housings are of helically wound metal wire, commonly of a flat wire that allows the inner surface of the housing to be relatively smooth. The supporting housing generally extends for the length of the cable system with the cable exposed only at the ends of the supporting housing. Both single and multiple strand cables are used. The cables are preferably lubricated to reduce operating friction and extend the life of the system. The lubricant is subject to contamination, including dirt, moisture, salt and sweat, at the system ends where the cable is exposed. Operation of the system results in contamination being carried into the housing, eventually causing increased friction, corrosion, wear and ultimately stretching or breakage of the cable. Frequent maintenance is necessary to avoid these problems, particularly if the system is routinely operated in dirty environments. Maintenance requires disassembly, cleaning, lubrication and reassembly.

Flexible supporting housings are often fitted with flexible polymeric tubular liners to reduce operating friction and maintenance. Additionally the cable may also be provided with a polymeric covering for the same reasons.

Cable systems for high performance applications such as bicycles are desired to have a minimal amount of weight. For these applications, it is known to use flexible supporting housings, preferably with a flexible polymeric tubular liner, only on the substantially curved portions of the systems so that the substantially straight portion comprises only an exposed portion of the cable. While offering significantly reduced weight, these types of systems suffer from increased contamination because of having a greater length of cable exposed to the environment.

SUMMARY OF THE INVENTION

The present invention relates to an improvement in mechanical control cable systems of the push-pull type, a conventional system comprising a cable enclosed by a flexible supporting housing having a flexible polymeric tubular liner, the system having at least one substantially curved portion and at least one substantially straight portion. The improvement relates to the substantially straight portion of the mechanical control cable system wherein the substantially straight portion consists essentially of the cable enclosed by the flexible polymeric tubular liner. The flexible supporting housing has been dispensed with for the substantially straight portions of the system. The flexible polymeric tubular liner is continuous between the ends of the mechanical cable system. Any substantially curved portions of the system retain a typical flexible metallic supporting housing or equivalent alternative supporting housing that enables the effective transfer of motion by mechanical control cable systems in spite of a change of direction.

DETAILED DESCRIPTION OF THE INVENTION

Figure 1:
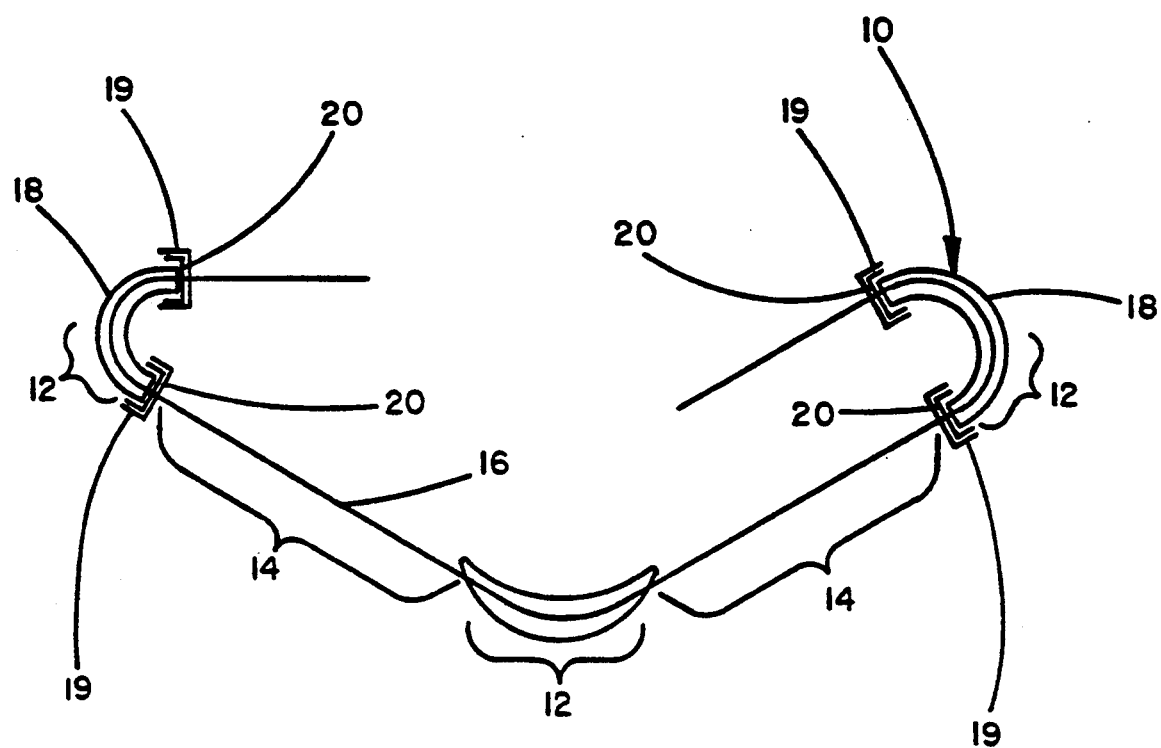
FIG. 1 describes a mechanical control cable system of the prior art.

FIG. 1 describes a mechanical control cable system 10 of the prior art. The system 10 has substantially curved portions 12 and substantially straight portions 14 and comprises a cable 16 that is enclosed by a supporting housing 18 over at least the substantially curved portions 12. Alternatively, both the substantially curved portions 12 and straight portions 14 are enclosed by a single length of housing that is continuous from one end of the system to the other. Systems in which the substantially straight portions 14 are not enclosed by a housing are used in situations where weight and system friction must be kept minimal, at the expense of increased contamination, wear and maintenance.

The system is conventionally affixed to a surface or framework by retainers 19. End caps 20 may optionally be fitted to finish the ends of the supporting housing 18. The ends of the mechanical control cable system 10 are represented by the locations at which retainers 19 are fitted to the supporting housing 18.

Figure 2A:
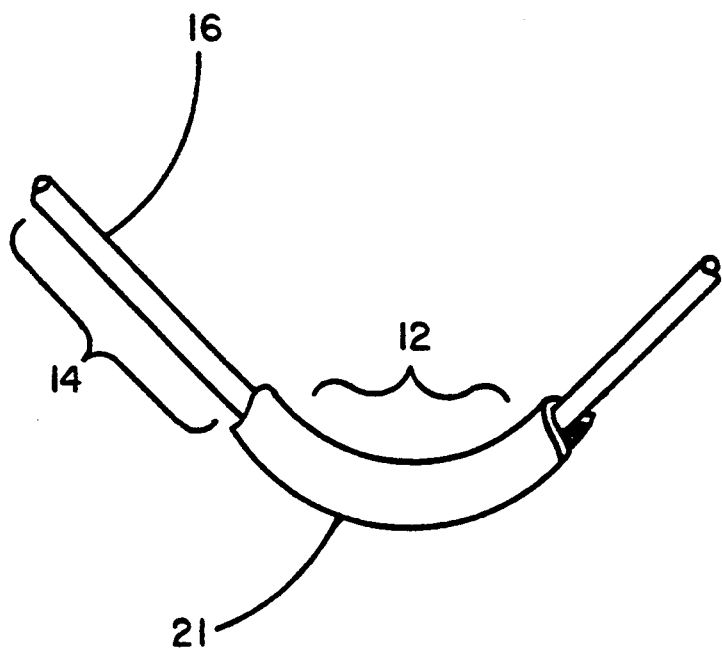
FIGS. 2A and 2B describe known alternative supporting housings in the form of a saddle and a pulley support for the substantially curved portions of the system.
Figure 2B:
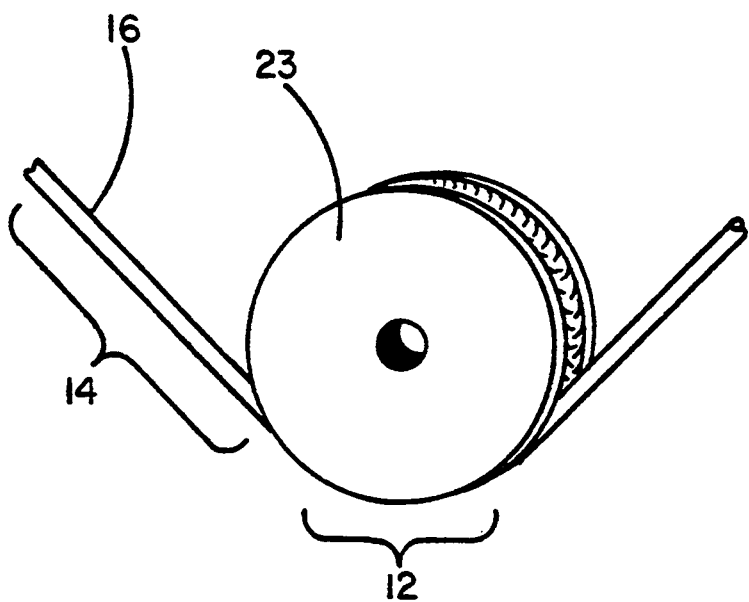

An alternative to the support provided by the enclosing supporting housing 18 for a substantially curved section 12 is the saddle support 21 shown in FIG. 2A. The saddle support 21 is essentially an open version of a conventional housing 18 that has been cut in half lengthwise and fitted to the inside of the substantially curved section. A pulley 23 may also be employed as an alternative saddle support as shown by FIG. 2B.

Figure 3:
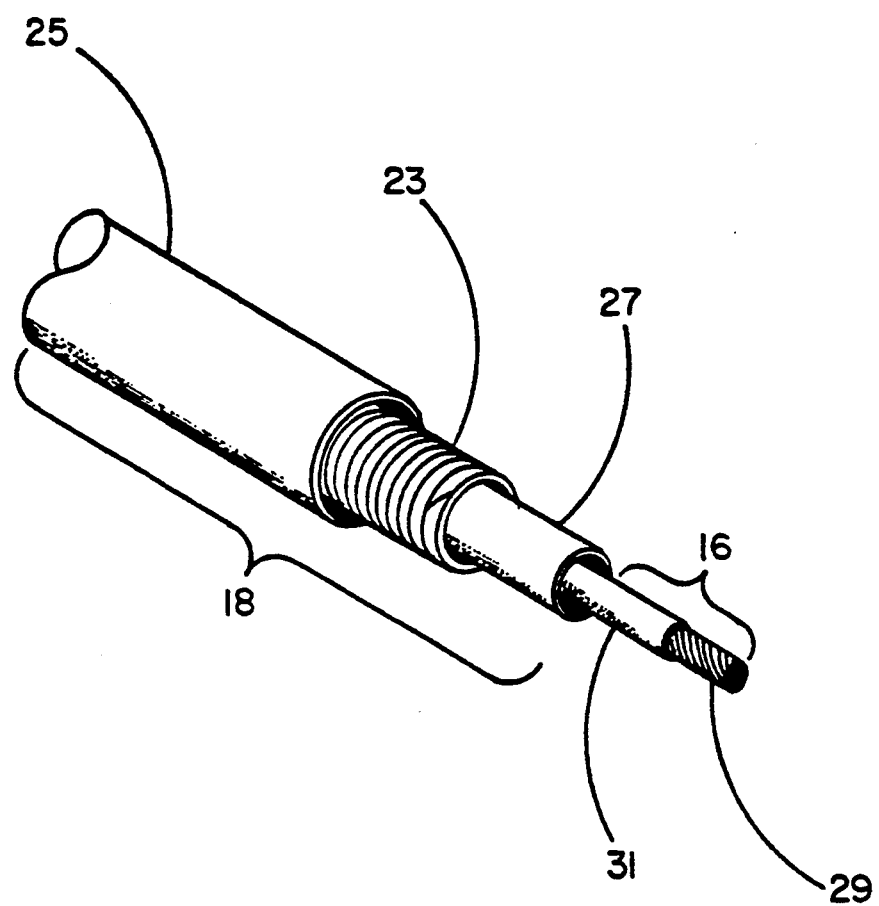
FIG. 3 is a descriptive view of a prior art cable and supporting housing system.

FIG. 3 is a descriptive view of a conventional supporting housing 18. The flexible tubular metallic supporting housing 23 is typically made from a helically wound metal wire. An optional polymeric covering 25 is often provided to the outer surface of the flexible tubular metal supporting housing 18 to increase its resistance to contamination and provide it with a smoother and more aesthetically pleasing exterior surface. Occasionally non-metallic supporting housings are used provided that the material chosen offers adequate rigidity and flexibility. For example, polymeric supporting housings, with or without molded exterior supporting ribs, are used in some applications.

The inner surface of the flexible tubular metal housing 23 is frequently provided with an optional flexible tubular polymeric liner 27 to increase the smoothness and lubricity of the inner surface on which the cable slides. Polymers that are commonly used for the liner include polyethylenes, polypropylenes, polyesters, polyamides, polyvinyl chlorides, and fluoropolymers such as polytetrafluoroethylene (PTFE), fluorinated ethylene propylene (FEP) and perfluoroalkoxy (PFA). The cable 16 is typically a single or multiple stranded wire 29 that is occasionally provided with an optional polymeric covering or coating 31. Suitable polymers for use as the cable covering or coating are the same as those listed above as suitable for the polymeric liner. For applications that are especially vulnerable to abrasive wear such as, for example, a system having sharply curved portions, it may be desirable to have the liner made from a harder, more compression resistant polymer than the polymer used as the cable covering.

Figure 4:
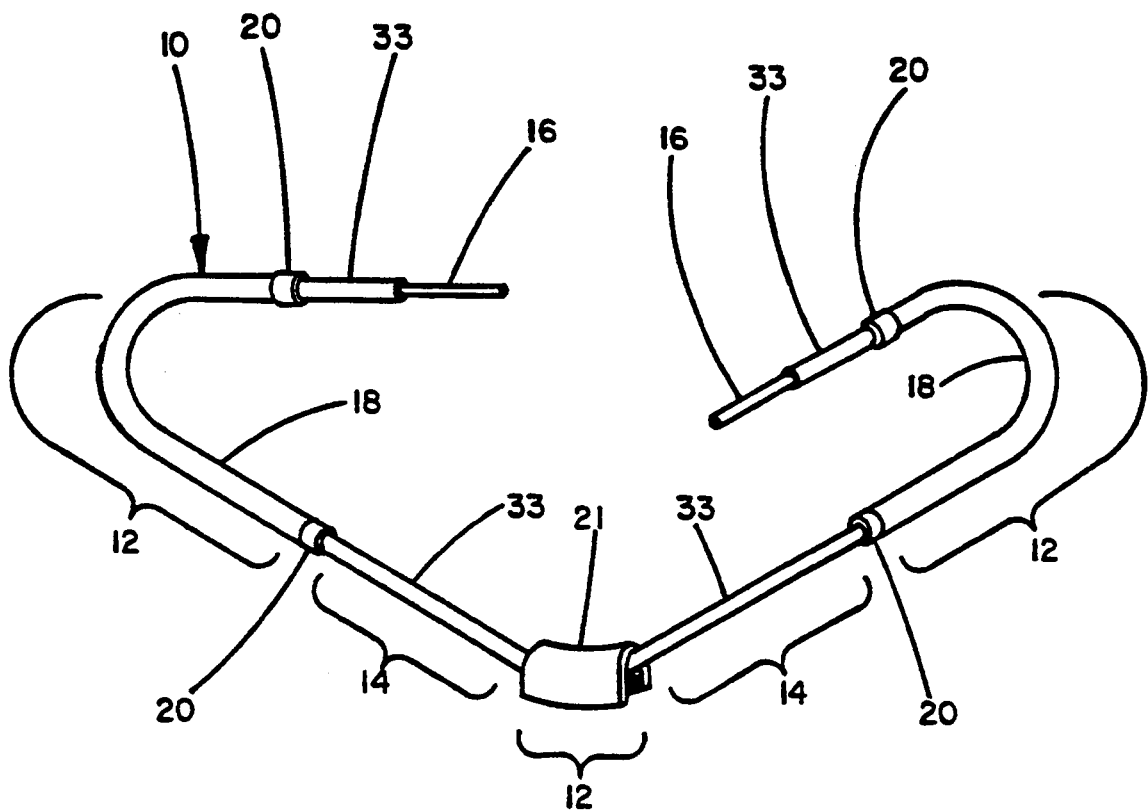
FIG. 4 describes a mechanical control cable system of the present invention.

The present invention relates to an improved mechanical control cable system as described by FIG. 4. It represents an improvement over the light-weight prior art system of FIG. 1 in that it incorporates a continuous flexible tubular polymeric liner 33 that extends continuously between the ends of the cable system 10 so that both the substantially curved portions 12 and substantially straight portions 14 of the system enclose the cable 16 by the continuous liner 33. Only the substantially curved portions 12 of the system 10 use the flexible supporting housing 18 to allow effective direction change of the transmitted force.

The inventive system provides the benefits of light weight and low operating friction while providing contamination protection to the cable by virtue of the continuous flexible tubular polymeric liner 33. The presence of the continuous liner 33 substantially reduces maintenance requirements that were the result of contamination of the prior art systems using no enclosure for the cable in the substantially straight portions of those systems.

Figure 5:
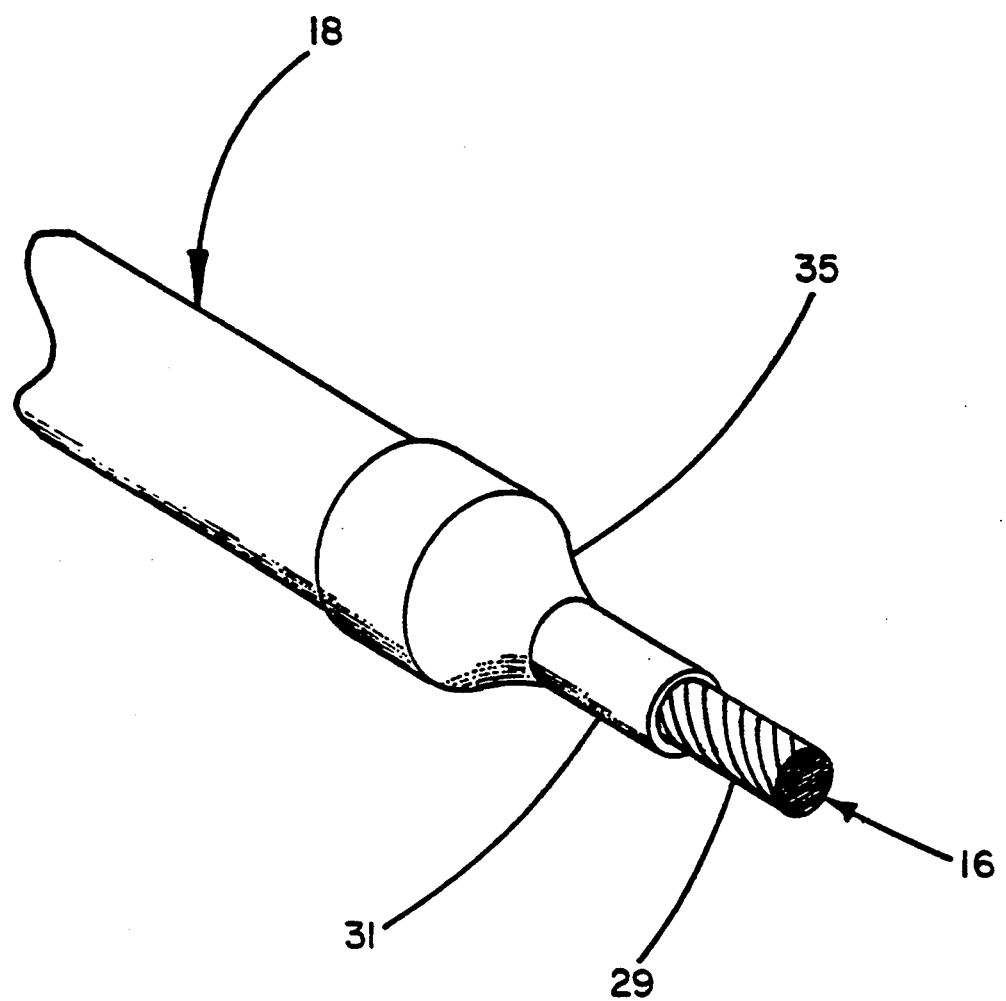
FIG. 5 describes a preferred embodiment of the inventive system incorporating a means for sealing.

As shown by the detailed sectional view of FIG. 5, the housing ends of the inventive system may optionally incorporate a means for sealing such as lip seal 35. Such a seal should be used with a cable 16 having a polymeric covering or coating 31, especially if a multiple stranded cable is used. The polymeric covering or coating 31 provides a smooth and lubricious surface for the cable 16 which enhances the effectiveness of the seal 35, reduces operating friction and increases the life of the seal. The use of such a seal will further reduce the vulnerability of the system to contamination and consequently further reduce the frequency of maintenance. The use of seals is considered to be a preferred embodiment of the invention for systems intended to operate in dirty environments, such as systems used on mountain bicycles.

The inventive mechanical control cable system can be made by cutting a desired length of flexible polymeric tubing for use as the continuous liner 33 and fitting appropriate lengths of flexible tubular metallic housing 18 over the exterior surface of the tubular liner portions that are to be curved. There should be a slight interference between the outer surface of the tubular liner and the inner surface of the flexible supporting housing. The liner may be pushed into the bore of the housing using a suitable amount of force. If desired an elastic adhesive such as a silicone adhesive may be applied to the interior surface of the housing prior to fitting the liner into the housing.

We claim:

1. A mechanical control cable system of the push-pull type comprising a cable having a length wherein a portion of said length is enclosed by a flexible supporting housing having a flexible polymeric tubular liner, said mechanical control cable system having at least one substantially curved portion and at least one substantially straight portion, wherein the at least one substantially straight portion of the mechanical control cable system consists essentially of the cable enclosed by the flexible polymeric tubular liner not enclosed by the flexible supporting housing, and wherein the flexible polymeric tubular liner is continuous between the ends of the mechanical control cable system.

2. A mechanical control cable system according to claim 1 wherein the length of cable has a polymeric covering.

3. A mechanical control cable system according to claim 2 wherein the polymeric covering is a polymer selected from the group consisting of polyethylenes, polypropylenes, polyesters, polyamides, polyvinyl chlorides, and fluoropolymers.

4. A mechanical control cable system according to claim 3 wherein the fluoropolymer is selected from the group consisting of polytetrafluoroethylene, fluorinated ethylene propylene and perfluoroalkoxy.

5. A mechanical control cable system according to claim 1 wherein the polymeric liner is a polymer selected from the group consisting of polyethylenes, polypropylenes, polyesters, polyamides, polyvinyl chlorides, and fluoropolymers.

6. A mechanical control cable system according to claim 5 wherein the fluoropolymer is selected from the group consisting of polytetrafluoroethylene, fluorinated ethylene propylene and perfluoroalkoxy.

7. A mechanical control cable system according to claim 1 wherein the ends of the liner incorporate means for sealing out contaminates between the surface of the cable and the ends of the liner.

8. A mechanical control cable system according to claim 7 wherein the means for sealing is a lip seal.

* * * * *

REEXAMINATION CERTIFICATE (3758th)
United States Patent [19]
Davidson et al.

[11] B1 5,353,626
[45] Certificate Issued May 11, 1999

[54] MECHANICAL CONTROL CABLE SYSTEM

[75] Inventors: Daniel F. Davidson, Flagstaff; David J. Myers, Camp Verde; Jerry L. Johnson, Flagstaff, all of Ariz.

[73] Assignee: Gore Holdings, Inc., Newark, Del.

Reexamination Request:
No. 90/004,596, Apr. 7, 1997

Reexamination Certificate for:
Patent No.: 5,353,626
Issued: Oct. 11, 1994
Appl. No.: 08/191,740
Filed: Jan. 31, 1994

[21] Appl. No.: 08/191,740

Related U.S. Application Data

[63] Continuation of application No. 08/062,476, May 13, 1993, abandoned, which is a continuation of application No. 08/806,526, Dec. 13, 1991, abandoned.

[51] Int. Cl.$^6$ .................................................. F16C 1/10
[52] U.S. Cl. ...................... 74/502.6; 74/502.4; 74/500.5; 74/501.5 R
[58] Field of Search ................ 74/500.5, 501.5 R–502.6

[56] References Cited

U.S. PATENT DOCUMENTS 3,938,405 2/1976 Sommerer .............................. 74/501 R
4,534,239 8/1985 Heimann .............................. 74/501 R

FOREIGN PATENT DOCUMENTS 60-99190 7/1985 Japan .............................. B62M 25/02

OTHER PUBLICATIONS

Ridge–Runner Magazine, Nov. 1990.
English translation of "2 Special Frame Work" from p. 4, Ridge–Runner Magazine, Nov. 1990.

*Primary Examiner*—Vinh T. Luong

[57] ABSTRACT

An improved mechanical control cable system of the push-pull type. Conventional push-pull cable systems typically include straight portions and curved portions. These conventional systems incorporate a push-pull cable having a metal wire housing enclosing at least the curved portion of the system and frequently both the curved and straight portions. These metal wire housings frequently incorporate a tubular polymeric liner only within the metal wire housing. The improved system has a continuous tubular polymeric liner enclosing both the curved and straight system portions while only the curved system portions are further enclosed by a metal wire housing.

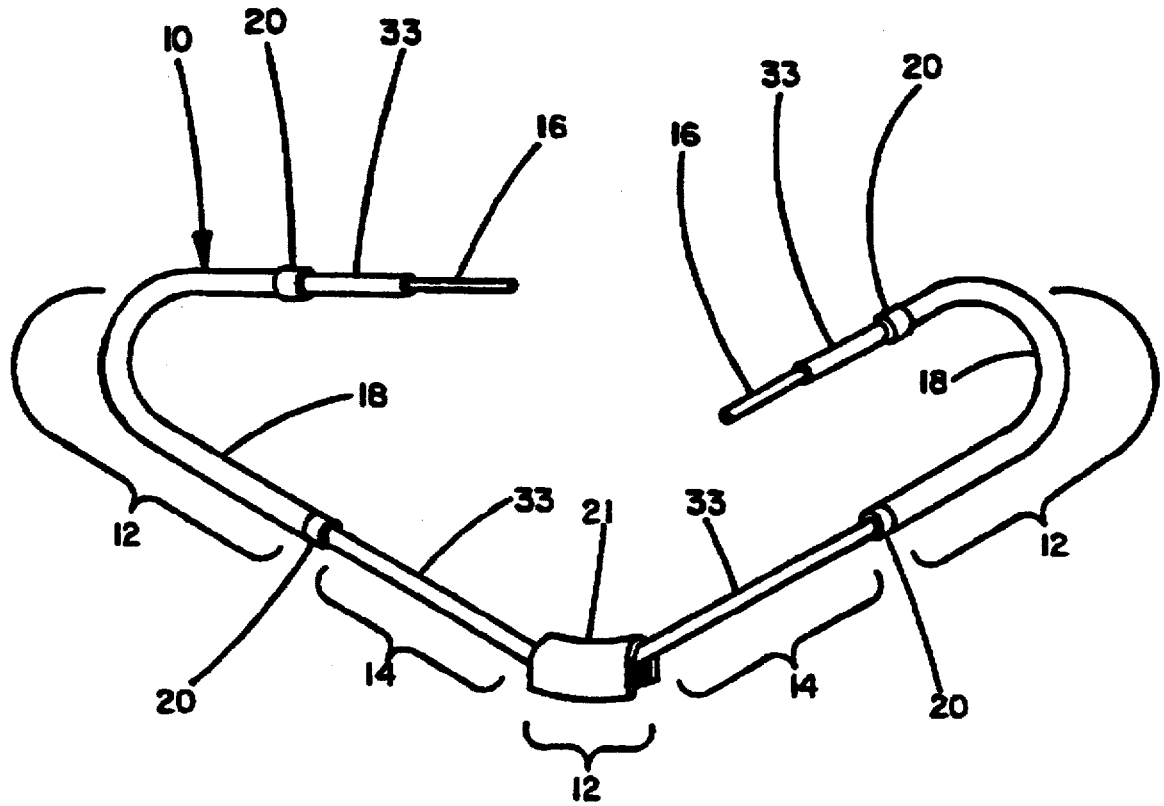

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–8, dependent on an amended claim, are determined to be patentable.

New claims 9–14 are added and determined to be patentable.

1. A mechanical control cable system (*10*) of the push-pull type comprising a cable (*16*) having a length wherein a portion of said length is enclosed by [a] flexible supporting housing (*18*) having a flexible polymeric tubular liner (*33*), said mechanical control cable system (*10*) having *two ends,* at least [one] *two* substantially curved portions (*12*) *at least one of which being enclosed by the flexible supporting housing (18)* and at least one substantially straight portion (*14*) *positioned between two substantially curved portions (12),* wherein the at least one substantially straight portion (*14*) of the mechanical control cable system (*10*) *between the two substantially curved portions (12)* consists essentially of the cable (*16*) enclosed by the flexible polymeric tubular liner (*33*) not enclosed by the flexible supporting housing (*18*), and wherein the flexible polymeric tubular liner (*33*) is continuous between the *two* ends of the mechanical control cable system (*10*).

9. A mechanical control cable system according to claim 2 wherein the polymeric covering of the length of cable comprises a fluoropolymer.

10. A mechanical control cable system according to claim 2 wherein the polymeric covering of the length of cable comprises polytetrafluoroethylene.

11. A mechanical control cable system according to claim 1 wherein the polymeric tubular liner comprises a fluoropolymer.

12. A mechanical control cable system according to claim 1 wherein both the polymeric tubular liner and the polymer covering of the length of cable comprise a fluoropolymer.

13. A mechanical control cable system according to claim 1 wherein both the polymeric tubular liner and the polymeric covering of the length of cable comprises polytetrafluoroethylene.

14. A control cable system comprising:
  a) a length of cable having two ends;
  b) a continuous length of polymeric tubular liner enclosing the length of cable between the ends;
  c) first and second lengths of supporting housing each supporting different curved portions of the length of the polymeric tubular linear;
  d) wherein a straight portion of the polymeric tubular liner extends between the first and second lengths of supporting housing and separates the first and second lengths of supporting housing such that the polymeric tubular liner is exposed and not supported by either of the first or second lengths of supporting housing.

* * * * *